United States Patent
Okugawa

(10) Patent No.: US 8,254,019 B2
(45) Date of Patent: Aug. 28, 2012

(54) CONFOCAL MICROSCOPE APPARATUS

(75) Inventor: Hisashi Okugawa, Yokosuka (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/585,888

(22) Filed: Sep. 28, 2009

(65) Prior Publication Data

US 2010/0053736 A1   Mar. 4, 2010

Related U.S. Application Data

(63) Continuation of application No. PCT/JP2008/001486, filed on Jun. 11, 2008.

(30) Foreign Application Priority Data

Jun. 13, 2007  (JP) ................................ 2007-156665

(51) Int. Cl.
  *G02B 21/00*  (2006.01)
(52) U.S. Cl. ........................................................ 359/368
(58) Field of Classification Search .................. 359/363, 359/368
  See application file for complete search history.

(56) References Cited

U.S. PATENT DOCUMENTS

| | | | |
|---|---|---|---|
| 7,271,953 B2 | 9/2007 | Okugawa et al. | |
| RE41,984 E | 12/2010 | Kitagawa | |
| 2003/0228053 A1* | 12/2003 | Li et al. | 382/154 |
| 2005/0213206 A1* | 9/2005 | Okugawa et al. | 359/385 |
| 2006/0033988 A1* | 2/2006 | Mikuriya et al. | 359/385 |
| 2007/0103693 A1 | 5/2007 | Everett et al. | |
| 2009/0010504 A1 | 1/2009 | Okugawa et al. | |
| 2010/0020392 A1 | 1/2010 | Okugawa | |

FOREIGN PATENT DOCUMENTS

| | | |
|---|---|---|
| JP | A-2005-274591 | 10/2005 |
| WO | WO 2007/010697 A1 | 1/2007 |

OTHER PUBLICATIONS

Aug. 11, 2010 Office Action issued in U.S. Appl. No. 12/585,890.
Feb. 25, 2011 Office Action issued in U.S. Appl. No. 12/585,890.
Jun. 30, 2011 Office Action issued in U.S. Appl. No. 12/585,890.
Nov. 16, 2011 Office Action issued in U.S. Appl. No. 12/585,890.
Sep. 16, 2008 International Search Reports issued in International Application No. PCT/JP2008/001487.
May 19, 2010 Office Action issued in U.S. Appl. No. 12/585,890.
Dec. 17, 2009 Written Opinion of the International Searching Authority issued in International Application No. PCT/JP2008/001487.
Dec. 17, 2009 International Preliminary Report on Patentability issued in International Application No. PCT/JP2008/001487.

* cited by examiner

*Primary Examiner* — Lee Fineman
(74) *Attorney, Agent, or Firm* — Oliff & Berridge, PLC

(57) ABSTRACT

The present application generates an image suitable for collectively observing a whole area or all wavelength components in a viewing field. A confocal microscope apparatus includes a detecting unit being disposed on a collecting location of the collecting optical system, separating incident light into a light from a vicinity of a collecting point on the sample and a light from a peripheral of the vicinity, and detecting each of the lights; and an image generating unit generating an image of the sample by a light signal from the vicinity and a light signal from the peripheral of the vicinity, and setting a ratio of the signal of the light from the vicinity of the collecting point to the signal of the light from the peripheral of the vicinity for each of areas on the image.

12 Claims, 10 Drawing Sheets

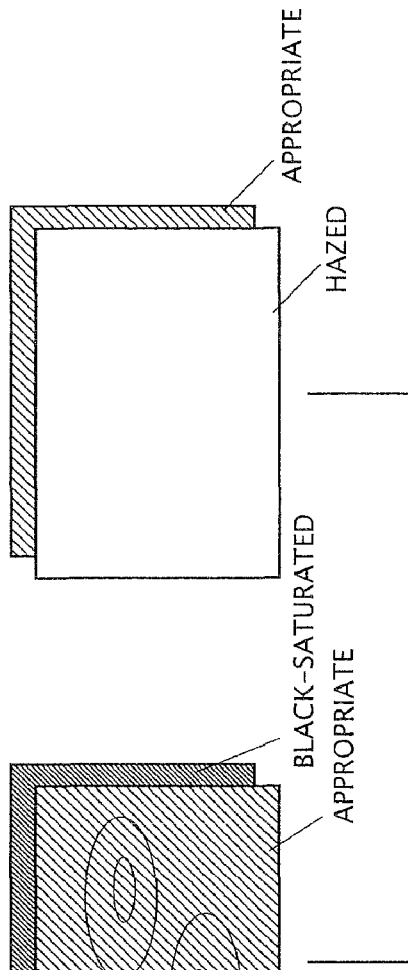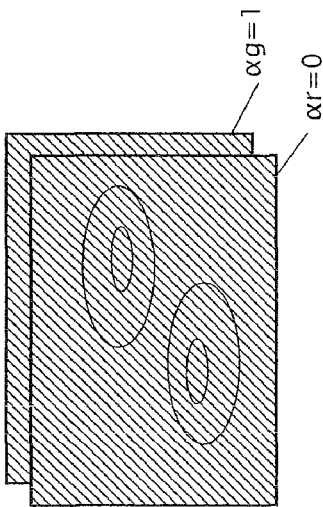

CONFOCAL MICROSCOPE APPARATUS

CROSS REFERENCE TO THE RELATED APPLICATIONS

This application is a continuation application of International Application PCT/JP2008/001486, filed Jun. 11, 2008, designating the U.S., and claims the benefit of priority from Japanese Patent Application No. 2007-156665, filed on Jun. 13, 2007, the entire contents of which are incorporated herein by reference.

BACKGROUND

1. Field

The present application relates to a confocal microscope apparatus capable of obtaining, in one scanning, an image formed by emission light from a viewing layer of a sample and an image formed by emission light from bilateral layers of the viewing layer.

2. Description of the Related Art

Patent Document 1: WO 2007/010697 discloses a confocal microscope apparatus capable of obtaining, in one scanning, an image formed by emission light from a viewing layer of a sample and an image formed by emission light from bilateral layers of the viewing layer. In this confocal microscope apparatus, it is possible to change sectioning widths and a brightness of the images by changing a composite method of the two types of images.

Therefore, a user of this confocal microscope apparatus can freely change the sectioning widths and the brightness of the images by changing, after obtaining the images, the composite method of the two types of images. Accordingly, there is no need to obtain the images again and again, which enables to obtain appropriate images in a short period of time and to reduce optical damage to the sample.

However, when a significantly dark portion and a significantly bright portion exist in one viewing field, it has been required to change, on a case-by-case basis, the composite method in accordance with a brightness of a portion to be observed.

SUMMARY

Accordingly, the present embodiment has a proposition to provide a confocal microscope apparatus capable of generating an image suitable for collectively observing a whole area or all wavelength components in a viewing field.

A confocal microscope apparatus of the present embodiment is characterized in that it includes a light source; an illuminating optical system collecting light from the light source onto a sample; a collecting optical system collecting light from the sample; a detecting unit being disposed on a collecting location of the collecting optical system, separating incident light into at least a light from a vicinity of a collecting point on the sample and a light from a peripheral of the vicinity of the collecting point, and detecting each of the lights; and an image generating unit generating an image of the sample by performing calculation processing on a signal of the light from the vicinity of the collecting point and a signal of the light from the peripheral of the vicinity of the collecting point output from the detecting unit, and setting a ratio of the signal of the light from the vicinity of the collecting point to the signal of the light from the peripheral of the vicinity of the collecting point for each of areas on the image.

Note that the image generating unit may perform calculation of summation or calculation of difference between the signal of the light from the vicinity of the collecting point and the signal of the light from the peripheral of the vicinity of the collecting point in accordance with the ratio being set.

Further, the image generating unit may set the ratio based on the signal of the light from the vicinity of the collecting point.

Further, the image generating unit may sequentially generate the image while setting the ratio for each of the areas.

Further, the image generating unit may have a storage unit storing each of the signal of the light from the vicinity of the collecting point and the signal of the light from the peripheral of the vicinity of the collecting point, and set the ratio for each of the areas in the storage unit.

Further, the image generating unit may set the ratio for each of the areas in accordance with an instruction from a user.

Further, another confocal microscope apparatus of the present embodiment is characterized in that it includes a light source; an illuminating optical system collecting light from the light source onto a sample; a collecting optical system collecting light from the sample; a detecting unit being disposed on a collecting location of the collecting optical system, separating incident light into at least a light from a vicinity on a collecting point of the sample and a light from a peripheral of the collecting point, separating each of the lights into wavelength components, and detecting each of the lights for each of the wavelength components; and an image generating unit generating an image of the sample for each of the wavelength components by performing calculation processing on a signal of the light from the vicinity of the collecting point for each of the wavelength components and a signal of the light from the peripheral of the vicinity of the collecting point for each of the wavelength components output from the detecting unit, and setting a ratio of the signal of the light from the vicinity of the collecting point to the signal of the light from the peripheral of the vicinity of the collecting point for each of areas on the image for each of the wavelength components.

Note that the image generating unit may perform calculation of summation or calculation of difference between the signal of the light from the vicinity of the collecting point and the signal of the light from the peripheral of the vicinity of the collecting point in accordance with the ratio being set.

Further, the image generating unit may set the ratio based on the signal of the light from the vicinity of the collecting point.

Further, the image generating unit may sequentially generate the image while setting the ratio for each of the areas.

Further, the image generating unit may have a storage unit storing each of the signal of the light from the vicinity of the collecting point and the signal of the light from the peripheral of the vicinity of the collecting point, and set the ratio for each of the areas in the storage unit.

Further, the image generating unit may set the ratio for each of the areas in accordance with an instruction from a user.

BRIEF DESCRIPTION OF THE DRAWINGS

FIGS. 16A, 16B, 16C, and 16D are views for explaining an appropriate image of the third embodiment.

DETAILED DESCRIPTION OF THE EMBODIMENTS

First Embodiment

A first embodiment of a confocal microscope apparatus of the present invention will be described.

Figure 1:
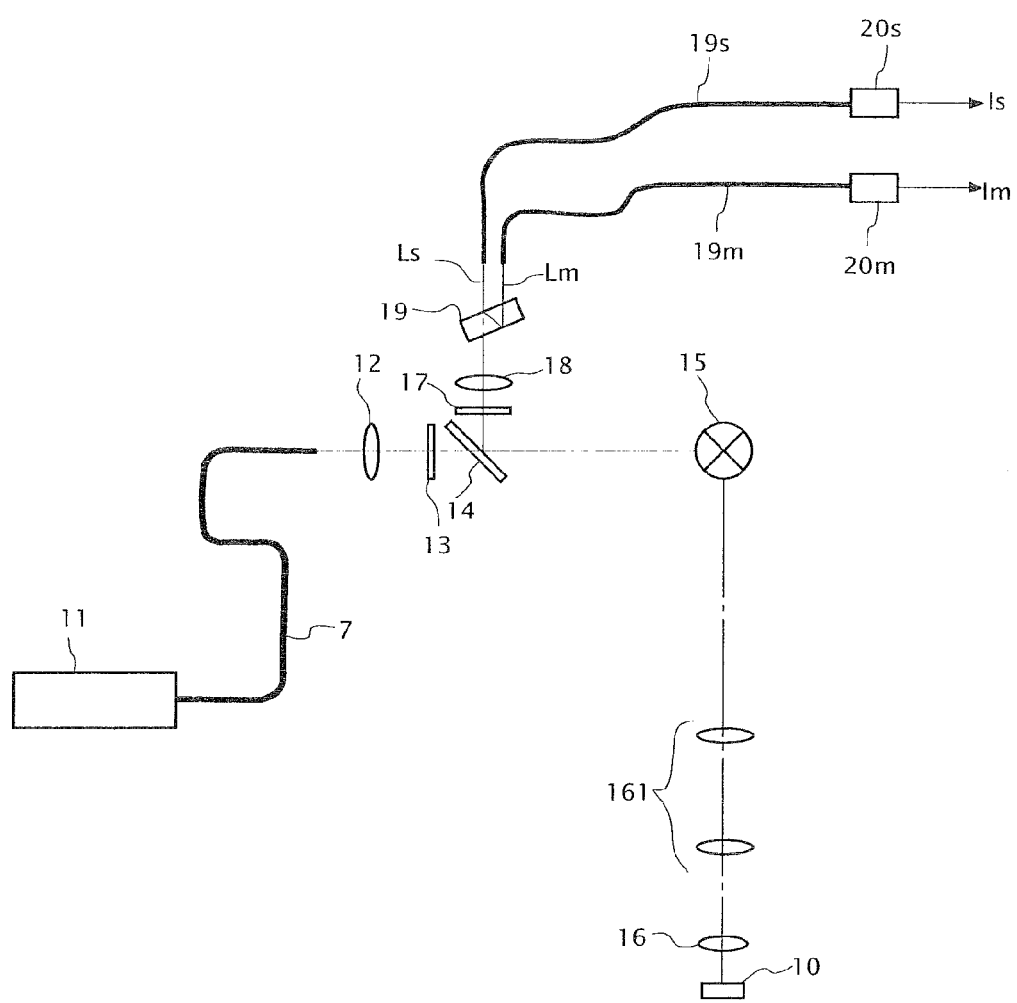
FIG. 1 is a structural view of optical systems of a confocal microscope apparatus.

FIG. 1 is a structural view of optical systems of the confocal microscope apparatus. As shown in FIG. 1, in the confocal microscope apparatus, a laser unit 11, an optical fiber 7, a collimating lens 12, a filter 13, a dichroic mirror 14, a galvanometer scanner 15, a relay lens 161, an objective lens 16, a sample 10, a filter 17, a collecting lens 18, a light separating member 19, an optical fiber 19s, an optical fiber 19m, a light detector 20s, a light detector 20m, and the like are disposed.

The sample 10 is, for instance, a cultured sample formed by culturing a living cell, and the living cell is previously dyed by a predetermined fluorescent material. A position of the sample 10 in an optical axis direction is previously adjusted by a not-shown vertically moving mechanism of the microscope so that a specimen exists on a focal plane of the objective lens 16. Hereinafter, an optical axis direction of the objective lens 16 is set as Z direction, and a layer of the sample 10 that exists within a focus depth of the objective lens 16 is referred to as "viewing layer".

The laser unit 11 emits laser light whose wavelength is the same as an excitation wavelength of the predetermined fluorescent material. The laser light emitted from the laser unit 11 propagates inside the optical fiber 7, and after being turned into parallel pencil of light by the collimating lens 12, it is incident on the dichroic mirror 14 via the filter 13. The laser light passes through the dichroic mirror 14, and after being sequentially reflected by two mirrors of the galvanometer scanner 15, it passes through the relay lens 161 and the objective lens 16, and is collected at one point on the viewing layer of the sample 10. The fluorescent material is excited in an area to which the laser light is irradiated, namely, a collecting point, and in the vicinity thereof, which results in generation of fluorescence.

The generated fluorescence passes through the objective lens 16, the relay lens 161, and the galvanometer scanner 15 by following, in the opposite direction, the same light path as that of the laser light directed to the collecting point, and advances toward the dichroic mirror 14. The fluorescence is reflected by the dichroic mirror 14, and is incident on the collecting lens 18 via the filter 17. The fluorescence is incident on the light separating member 19 while being collected by the collecting lens 18, and is separated into two fluorescences Ls and Lm. The details of the light separating member 19 will be described later.

The one fluorescence Ls separated in the light separating member 19 is incident on the light detector 20s after propagating inside the optical fiber 19s, and is converted into a fluorescence signal Is. The other fluorescence Lm separated in the light separating member 19 is incident on the light detector 20m after propagating inside the optical fiber 19m, and is converted into a fluorescence signal Im.

Accordingly, by synchronously driving the laser unit 11, the galvanometer scanner 15, the light detector 20s, and the light detector 20m, the above-described confocal microscope apparatus can obtain the two types of fluorescence signals Is and Im in a parallel manner while scanning the sample 10 with the laser light.

Figure 2:
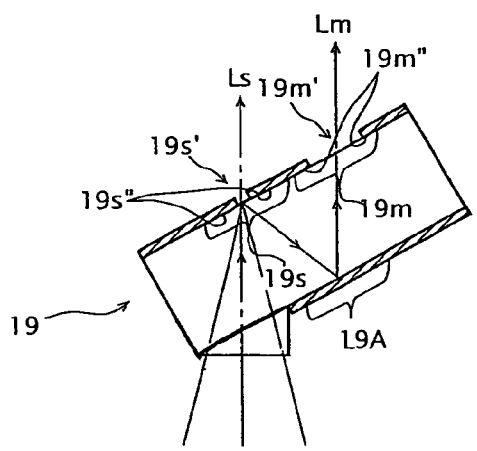
FIG. 2 is a view for explaining a light separating member 19.

FIG. 2 is a view for explaining the light separating member 19. As shown in FIG. 2, the entire of the light separating member 19 is formed of a member transparent to the incident fluorescence, and a light separating surface 19s, a light separating surface 19m, and a reflecting surface 19A are formed on the member.

The light separating surface 19s is formed of a micro circular transmitting surface (pinhole) 19s' and a reflecting surface 19s" that covers a peripheral area of the pinhole 19s', and the light separating surface 19m is formed of a circular transmitting surface 19m' and a reflecting surface 19m" that covers a peripheral area of the transmitting surface 19m'. Among the above, the pinhole 19s' has a diameter rs corresponding to a diameter of the aforementioned collecting point, and the transmitting surface 19m' has a diameter rm that is larger than the diameter rs of the pinhole 19s' and is expressed by 2×rs, for example.

The fluorescence incident on the light separating member 19 from the collecting lens 18 is incident on the light separating surface 19s, and is separated into a fluorescence that transmits through the pinhole 19s' and a fluorescence that is reflected by the reflecting surface 19s". Between the two fluorescences, the one reflected by the reflecting surface 19s" advances toward the reflecting surface 19A, and after being reflected by the reflecting surface 19A, it is incident on the light separating surface 19m and separated into a fluorescence that transmits through the transmitting surface 19m' and a fluorescence that is reflected by the reflecting surface 19m". Among the above, the fluorescence transmitted through the pinhole 19s' is the aforementioned fluorescence Ls, and the fluorescence transmitted through the transmitting surface 19m' is the aforementioned fluorescence Lm.

Here, a disposition place of the pinhole 19s' and a disposition place of the transmitting surface 19m' can be regarded to exist on the same focal plane, since a difference between the optical path lengths of the disposition places is sufficiently small compared to a focus depth of the collecting lens 18.

Figure 3:
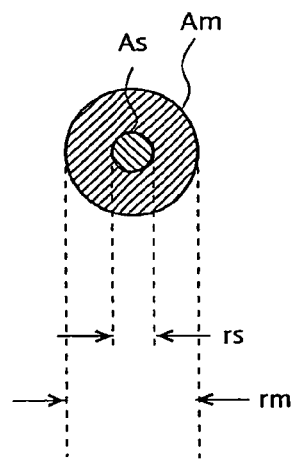
FIG. 3 is a view for explaining an area on a focal plane of a collecting lens 18.

As shown in FIG. 3, in an area on the focal plane of the collecting lens 18, the fluorescence Ls corresponds to a fluorescence that advances toward a circular area As of a center of the focal plane of the collecting lens 18, and the fluorescence Lm corresponds to a fluorescence that advances toward a ring-shaped area Am of an outside of the circular area As (a diameter of the circular area As corresponds to the aforementioned rs, and an outside diameter of the ring-shaped area Am corresponds to the aforementioned rm).

Figure 4:
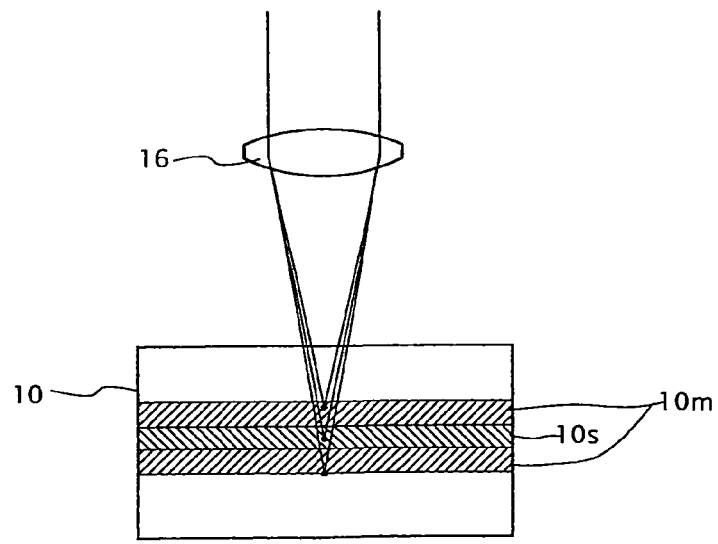
FIG. 4 is a view for explaining a viewing layer of a sample 10 and bilateral layers of the viewing layer.

Emission sources of these respective fluorescences are shown in FIG. 4, in which the emission source of the fluorescence Ls that advances toward the circular area As is a viewing layer 10s of the sample 10, and the emission sources of the fluorescence Lm incident on the ring-shaped area Am are bilateral layers 10m of the viewing layer 10s. Accordingly, in the confocal microscope apparatus of the present embodiment, the fluorescence Ls from the viewing layer 10s and the fluorescence Lm from the bilateral layers 10m of the viewing layer are detected individually and in a parallel manner.

Note that it is also possible to omit the light separating member 19 and dispose a light detector capable of individually detecting an intensity of the fluorescence Ls and an intensity of the fluorescence Lm, on a place where the light separating member 19 is disposed. A light detecting surface of such a light detector has a light detecting area having the same shape as that of the circular area As, and a light detecting area having the same shape as that of the ring-shaped area Am.

Figure 5:
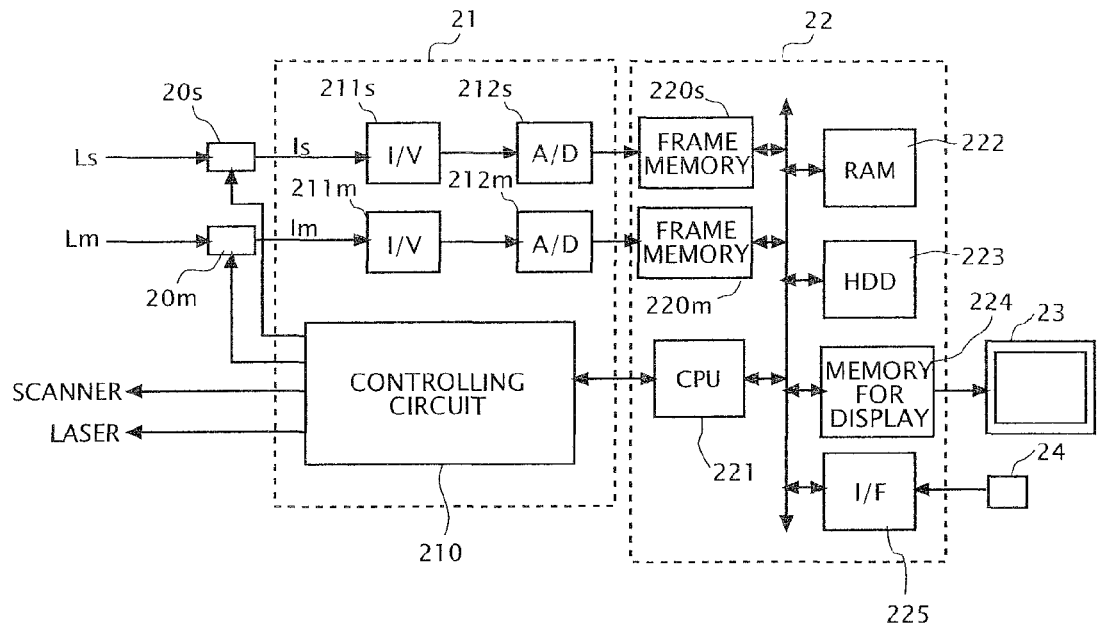
FIG. 5 is a structural view of a control system of the confocal microscope apparatus.

FIG. 5 is a structural view of a control system of the confocal microscope apparatus. A shown in FIG. 5, the confocal microscope includes a controller 21, a computer 22, a monitor 23, and an input device 24.

The controller 21 is provided with two I/V converters 211s and 211m, two A/D converters 212s and 212m, and a controlling circuit 210. The computer 22 is provided with a CPU 221, two frame memories 220s and 220m, a RAM 222, a hard disk drive 223, a memory for display 224, and an interface 225.

The fluorescence signal Is output from the light detector 20s passes through the I/V converter 211s, and is converted into a voltage signal. The fluorescence signal Is output from the I/V converter 211s passes through the A/D converter 212s, and is converted into a digital signal. The fluorescence signal Is output from the A/D converter 212s is input into the frame memory 220s.

The fluorescence signal Im output from the light detector 20m passes through the I/V converter 211m, and is converted into a voltage signal. The fluorescence signal Im output from the I/V converter 211m passes through the A/D converter 212m, and is converted into a digital signal. The fluorescence signal Im output from the A/D converter 212m is input into the frame memory 220m.

In accordance with a scanning indication from the CPU 221, the controlling circuit 210 performs scanning by synchronously controlling the aforementioned laser unit 11, the galvanometer scanner 15, the light detector 20s, and the light detector 20m. Through the scanning, the fluorescence signal Is for one frame and the fluorescence signal Im for one frame are accumulated in the frame memory 220s and the frame memory 220m, respectively, in a parallel manner. When the scanning is completed, the controlling circuit 210 gives an end signal to the CPU 221.

The fluorescence signal Is for one frame accumulated in the frame memory 220s through the scanning represents an image of the viewing layer 10s of the sample 10 (refer to FIG. 4), and the fluorescence signal Im for one frame accumulated in the frame memory 220m through the scanning represents an image of the bilateral layers 10m of the viewing layer (refer to FIG. 4).

In the hard disk drive 223 of the computer 22, a program for observation is previously stored, and the CPU 221 reads the program for observation on the RAM 222 and executes the program. At this time, the CPU 221 recognizes an indication from a user via the input device 24 and the interface 225, and gives the scanning indication to the controlling circuit 210 according to need.

Further, the CPU 221 can display the image of the viewing layer 10s on the monitor 23 by reading the fluorescence signal Is for one frame accumulated in the frame memory 220s at the time of scanning and writing the signal into a predetermined area of the memory for display 224. Further, the CPU 221 can display an image of all layers including the viewing layer 10s and the bilateral layers 10m on the monitor 23 by reading the fluorescence signals Is and Im accumulated in the frame memories 220s and 220m at the time of scanning, generating a summation signal (Is+Im) being a resultant of the sum of both signals, and writing the summation signal into a predetermined area of the memory for display 224. Specifically, the CPU 221 can display an image having a narrow sectioning width represented by the fluorescence signal Is, and an image having a wide sectioning width represented by the summation signal (Is+Im).

Further, it is also possible that the CPU 221 stores the images obtained through the scanning into the hard disk drive 223. At this time, the image represented by the fluorescence signal Is and the image represented by the fluorescence signal Im are preferably stored individually. This is because if the images are stored individually, two types of images having different sectioning widths can be generated any number of times at any timing.

Figure 6:
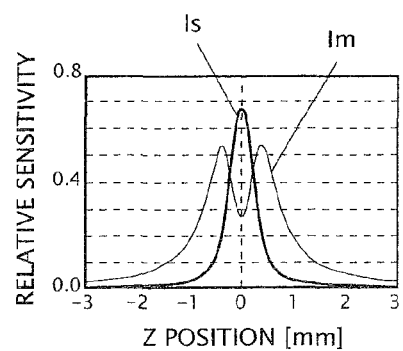
FIG. 6 is a view showing a sensitivity characteristic of a fluorescence signal Is in a Z direction.

Here, a relationship between a level of the fluorescence signal Is and a Z position in the sample 10 (sensitivity characteristic) can be represented by a thick curve in FIG. 6. It can be confirmed that the fluorescence signal Is includes a large number of signals of fluorescence emitted from the viewing layer (Z=−0.3 to +0.3). Note that when Z=0 in a horizontal axis in FIG. 6, it indicates that the Z position is on the focal plane of the objective lens 16.

Further, a relationship between a level of the fluorescence signal Im and the Z position in the sample 10 (sensitivity characteristic) can be represented by a thin curve in FIG. 6. It can be confirmed that the fluorescence signal Im includes a large number of signals of fluorescence emitted from the bilateral layers of the viewing layer (in the vicinity of Z=−0.5, and in the vicinity of Z=+0.5).

Therefore, if a summation signal (Is+αIm) being a resultant of weighting summation of the fluorescence signal Is and the fluorescence signal Im is considered, the summation signal (Is+αIm) when α>0 represents a bright image having a wide sectioning width, and the summation signal (Is+αIm) when α<0 represents an image having a narrow sectioning width.

If the above is considered in an extended way, it is also possible to continuously change the sectioning width by continuously changing the value of α. Accordingly, if the CPU 221 displays the image represented by the summation signal (Is+αIm) in which the coefficient α is continuously changed in a range of −1 to +1, it is possible to continuously change the sectioning width of the image. Hereinafter, the coefficient α that contributes to the sectioning width is called "sectioning coefficient".

Note that in a normal observation, it is sufficient if the change in the sectioning coefficient α is in a range of −0.5 to +1. Accordingly, the change in the sectioning coefficient α is set to fall within a range of −0.5 to +1 in the following description.

Figure 7:
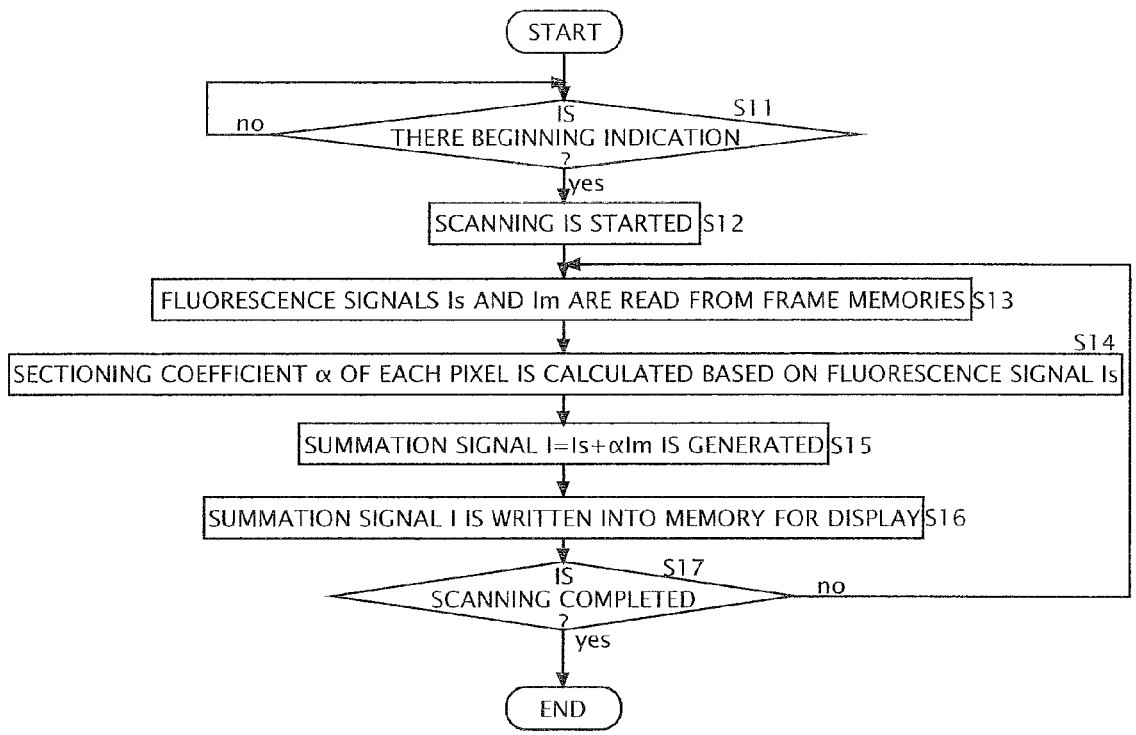
FIG. 7 is an operational flow chart of a CPU 221 of a first embodiment.

FIG. 7 is an operational flow chart of the CPU 221.

Step S11: The CPU 221 determines whether or not an observation beginning indication is input from a user. When the indication is input, the process proceeds to step S12.

Step S12: The CPU 221 gives a scanning indication to the controlling circuit 210. Accordingly, scanning is started, and the fluorescence signals Is and Im are started to be accumulated in the frame memories 220s and 220m, respectively.

Step S13: The CPU 221 reads the fluorescence signals Is and Im accumulated in the frame memories 220s and 220m. In the present step, the fluorescence signals Is and Im are assumed to be read.

Figure 8:
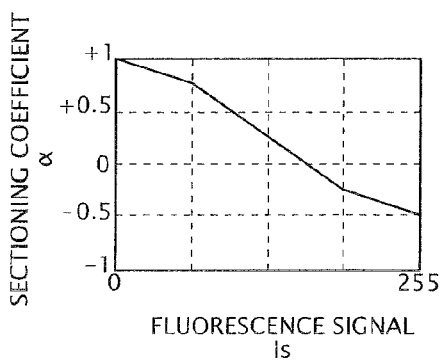
FIG. 8 is a view for explaining a look-up table.

Step S14: The CPU 221 calculates, based on the read fluorescence signal Is, the sectioning coefficient α for each pixel. At this time, a look-up table having an input-output characteristic as shown in FIG. 8 is used, for example. According to this look-up table, as the value of the fluorescence signal Is is larger, the value of the sectioning coefficient α becomes smaller, and as the value of the fluorescence signal Is is smaller, the value of the sectioning coefficient α becomes larger.

Step S15: The CPU 221 generates a summation signal I based on the calculated sectioning coefficient α, the read fluorescence signal Is, and the read fluorescence signal Im. The summation signal I for each pixel is represented by $Is+\alpha Im$, using the fluorescence signals Is and Im having a pixel number common to the each pixel, and the sectioning coefficient α having a pixel number common to the each pixel.

Step S16: The CPU 221 writes the summation signal I into a corresponding address of the memory for display 224.

Step S17: The CPU 221 determines whether or not the scanning is completed, based on the presence/absence of the end signal from the controlling circuit 210. If the scanning is not completed, the process goes back to step S13 to start the next processing, and if the scanning is completed, the flow is terminated.

Figure 9:
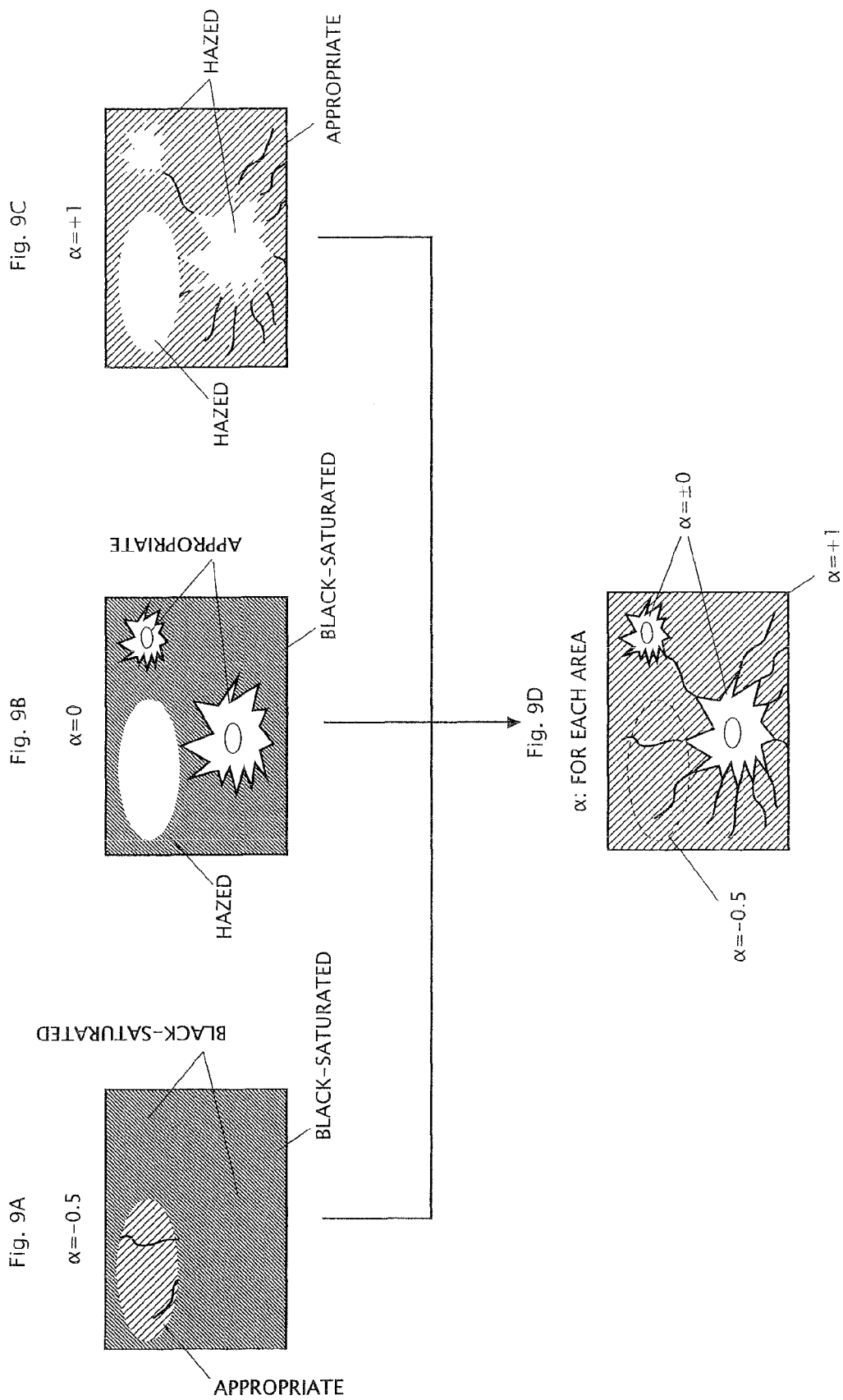
FIGS. 9A, 9B, 9C, and 9D are views for explaining an appropriate image of the first embodiment.

Through the above-described operation of the CPU 221, an image represented by the summation signal $I=Is+\alpha Im$ is displayed on the monitor 23 as shown in FIG. 9D, for example. The sectioning coefficient α of this image is different for each of areas, and further, the sectioning coefficient α in each of the areas takes a value suitable for the brightness of an object that exists in each of the areas. Hereinafter, this image is called "appropriate image", and an explanation thereof will be given in detail.

FIGS. 9A, 9B, and 9C show three types of images to be comparison objects of the appropriate image (FIG. 9D). These three types of images are different from the appropriate image in that the distribution of sectioning coefficient α in each image is homogeneous. The sectioning coefficient α of the whole image shown in FIG. 9A is −0.5, the sectioning coefficient α of the whole image shown in FIG. 9B is ±0, and the sectioning coefficient α of the whole image shown in FIG. 9C is +1.

Here, it is supposed that an appropriately bright area, a hazy area, and a black-saturated area exist on the image of FIG. 9B. In this case, if the sectioning coefficient α of the whole image is changed from ±0 to 1, the appropriately bright area becomes the hazy area, and the black-saturated area obtains an appropriate brightness, as shown in FIG. 9C, for instance. On the contrary, if the sectioning coefficient α of the whole image is changed from ±0 to −0.5, the appropriately bright area becomes the black-saturated area, and the hazy area obtains an appropriate brightness, as shown in FIG. 9A, for instance.

What the CPU 221 of the present embodiment performed in step S14 was processing for calculating, based on the brightness of each of the areas on the image shown in FIG. 9B, the sectioning coefficient α suitable for each of the areas.

For instance, the CPU 221 calculates the value of the sectioning coefficient α of the appropriately bright area on the image shown in FIG. 9B as ±0, calculates the value of the sectioning coefficient α of the hazy area on the image shown in FIG. 9B as −0.5, and calculates the value of the sectioning coefficient α of the black-saturated area on the image shown in FIG. 9B as +1.

Accordingly, the appropriate image (FIG. 9D) generated in this case is a resultant of mutual combination of the appropriately bright area on the image shown in FIG. 9A, the appropriately bright area on the image shown in FIG. 9B, and the appropriately bright area on the image shown in FIG. 9C. Therefore, in the appropriate image (FIG. 9D), each of the areas in the viewing field is represented by an appropriate brightness.

Note that the CPU 221 of the present embodiment sets the sectioning coefficient α for each pixel, but, it may set the sectioning coefficient α for each small area formed of a plurality of pixels in order to reduce the processing time taken for the setting.

Further, the CPU 221 of the present embodiment performs the generation and display of the appropriate image in real time during an obtaining period of the fluorescence signals, but, it may perform the generation and display of the appropriate image after the end of the obtaining period of the fluorescence signals. Alternatively, only the display of the image may be performed after the end of the obtaining period of the fluorescence signals.

Further, although the CPU 221 of the present embodiment calculates the sectioning coefficient α using the look-up table, it may perform the calculation through an equation.

Further, the CPU 221 of the present embodiment may store, in accordance with a storage indication or the like from a user, the generated appropriate image (or the value of the calculated sectioning coefficient α) in the hard disk drive 223. At this time, it is preferable that the appropriate image (or the value of the calculated sectioning coefficient α) is corresponded to the image represented by the fluorescence signal Is obtained through the same scanning and the image represented by the fluorescence signal Im obtained through the same scanning.

Further, the CPU 221 of the present embodiment refers to a brightness distribution of the image whose sectioning coefficient α is 0 (namely, the image represented by the fluorescence signal Is) for determining the sectioning coefficient α of each of the areas on the image, but, it may refer to a brightness distribution of the image whose sectioning coefficient α is other than 0 (the image represented by the summation signal (Is+Im), for instance).

Second Embodiment

A second embodiment of a confocal microscope apparatus of the present invention will be described. Here, only a difference from the first embodiment will be described. The difference is in the operation of the CPU 221.

Figure 10:
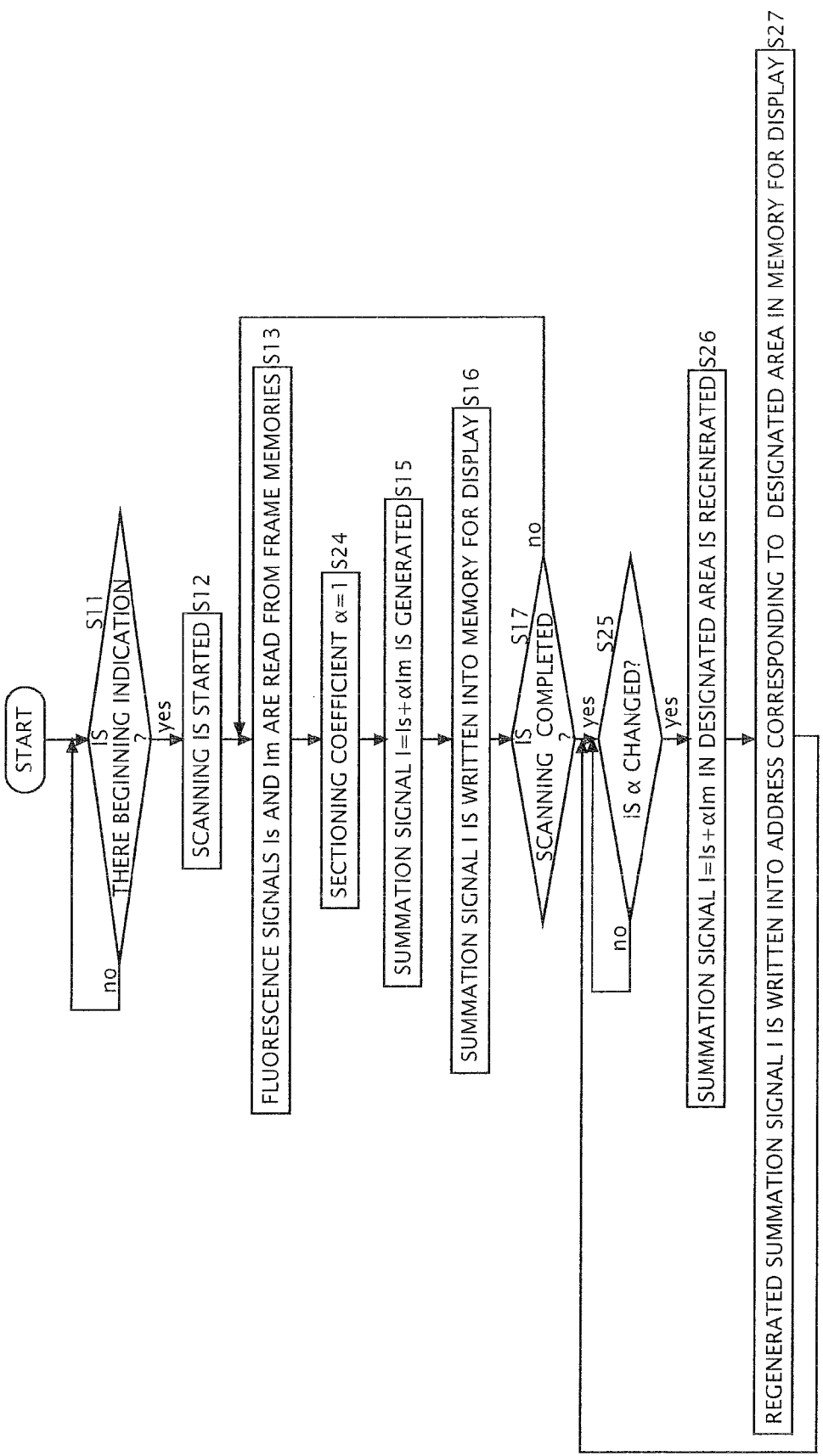
FIG. 10 is an operational flow chart of a CPU 221 of a second embodiment.

FIG. 10 is an operational flow chart of the CPU 221 of the present embodiment. A difference from the flow chart shown in FIG. 7 is that step S24 is executed instead of step S14, and steps S25 to S27 are executed at the subsequent stage of step S17. Hereinafter, steps S24 and S25 to S27 will be described.

Figure 11:
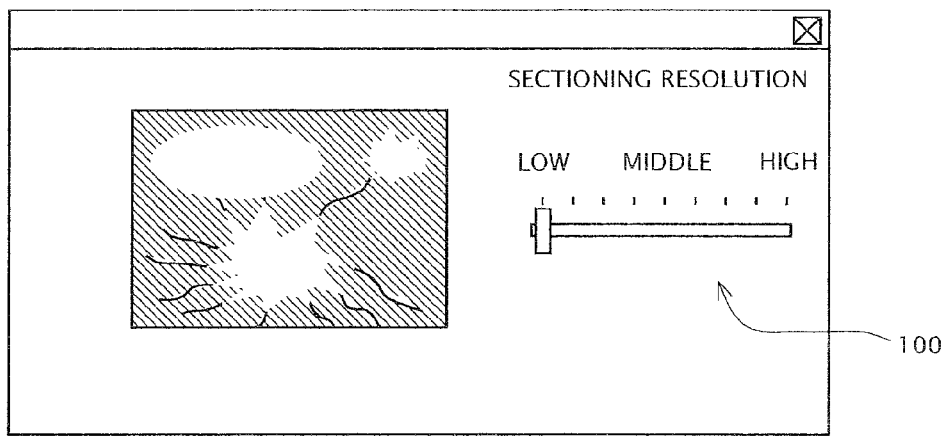
FIG. 11 is a view for explaining an image displayed on a monitor 23 of the second embodiment (state in which scanning is just completed).

Step S24: The CPU 221 sets a sectioning coefficient α of all pixels to 1. Therefore, through the scanning of the present embodiment, an image shown in FIG. 11, for instance, is displayed on the monitor 23. The brightness of all areas on this image is not always appropriate. Here, two types of areas, which are, an appropriately bright area and a hazy area are supposed to exist, as shown in FIG. 11.

At this time, a GUI image (slider bar 100) with which a user designates the sectioning coefficient α of the whole image to the CPU 221 is displayed on the monitor 23. The sectioning coefficient α is 1 at the beginning of the display of the image, so that the slider bar 100 indicates a position of "low".

Figure 12:
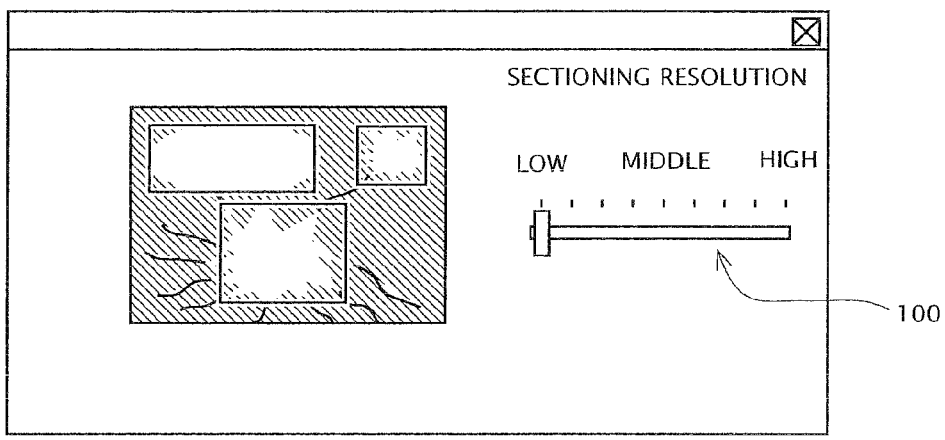
FIG. 12 is a view for explaining an image displayed on the monitor 23 of the second embodiment (state in which areas are designated).

Under this state, the user can draw rectangular shaped frames (or closed curves) on the image as shown in FIG. 12, for example, by operating the input device 24. Accordingly, one or a plurality of arbitrary area(s) on the image is (are) designated to the CPU 221. When the area is designated, the slider bar 100 becomes a GUI image with which the user designates the sectioning coefficient α of the designated area to the CPU 221.

Therefore, the user is only required to slide the slider bar 100 after designating the area in the image in which the sectioning coefficient α has to be changed, namely, the hazy area in the image. If the whole image is hazy, the user is only required to slide the slider bar 100 without designating the area.

Step S25: The CPU 221 determines whether or not the sectioning coefficient α is newly designated based on the presence/absence of the operation of the slider bar 100, in which when the coefficient is newly designated, the process proceeds to step S26, and when it is not newly designated, the CPU 221 stands by.

Step S26: The CPU 221 recognizes the sectioning coefficient α designated by the user based on the slide position of the slider bar 100, and regenerates, by using the sectioning coefficient α, a summation signal I=Is+αIm in the area designated by the user. Note that when the area is not designated by the user at that moment, the CPU 221 regards that the user designates the whole image, and conducts the same processing.

Step S27: The CPU 221 writes the regenerated summation signal I into an address corresponding to the area designated by the user in the memory for display 224, and the process goes back to step S25.

Figure 13:
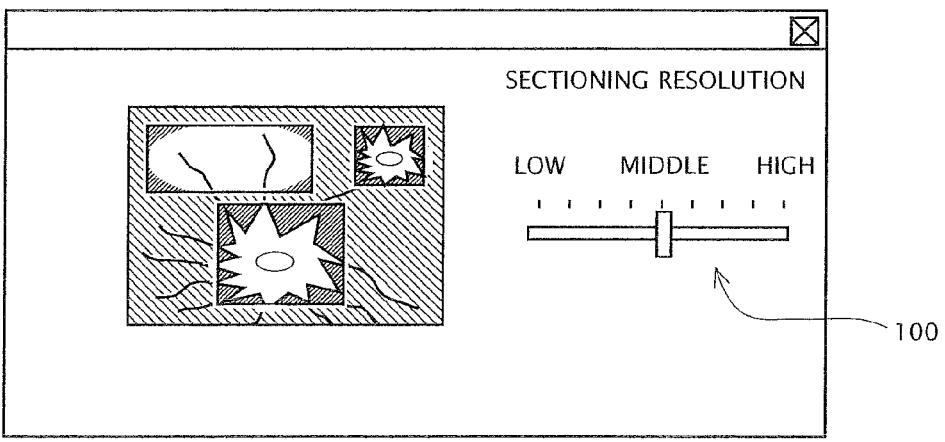
FIG. 13 is a view for explaining an image displayed on the monitor 23 of the second embodiment (state in which a sectioning width is changed).

Accordingly, when the user designates the areas on the image and slides the slider bar 100, the image on the monitor 23 is changed in real time from a state shown in FIG. 12 to a state shown in FIG. 13. If the user appropriately designates the areas and the sectioning coefficients α, the image becomes an appropriate image (namely, the image representing each of a dark object and a bright object in the viewing field in an appropriate brightness).

Note that the CPU 221 of the present embodiment allows the user to change the sectioning coefficient α of the area he/she designates, and fixes the sectioning coefficient α of a non-designated area to 1, but, it may reverse the relationship in accordance with an instruction from the user. If it is designed such that, it is possible to deal with both a case in which a lot of areas with significantly low brightness exist in the image and a case in which a lot of areas with significantly high brightness exist in the image.

Further, although the CPU 221 of the present embodiment makes the two types of areas having different sectioning coefficients α exist in the image in a mixed state, it may make three types or more of areas having different sectioning coefficients α exist in the image in a mixed state. In such a case, the user designates the two types or more of areas, and designates the sectioning coefficient α for each of the areas.

Note that the CPU 221 of the present embodiment performs the generation and display of the image whose sectioning coefficient α is 1 in real time during the obtaining period of the fluorescence signals, but, it may perform the generation and display of the image after the end of the obtaining period of the fluorescence signals. Alternatively, only the display of the image may be performed after the end of the obtaining period of the fluorescence signals.

Further, the CPU 221 of the present embodiment may store, in accordance with a storage indication or the like from the user, the aforementioned appropriate image (or the value of the sectioning coefficient α designated by the user) in the hard disk drive 223. At this time, it is preferable that the appropriate image (or the value of the sectioning coefficient α designated by the user) is corresponded to the image represented by the fluorescence signal Is and the image represented by the fluorescence signal Im obtained through the same scanning.

Third Embodiment

A third embodiment of a confocal microscope apparatus of the present invention will be described. Here, only differences from the first embodiment will be described. A first difference is that each of the light detectors 20s and 20m is made to have two channels, and each of the I/V converters 211s and 211m, the A/D converters 212s and 212m, and the frame memories 220s and 220m is made to have two systems according thereto. Therefore, each of the total number of the light detectors, the I/V converters, the A/D converters, and the frame memories becomes 4. Further, a second difference is in the operation of the CPU 221.

Figure 14:
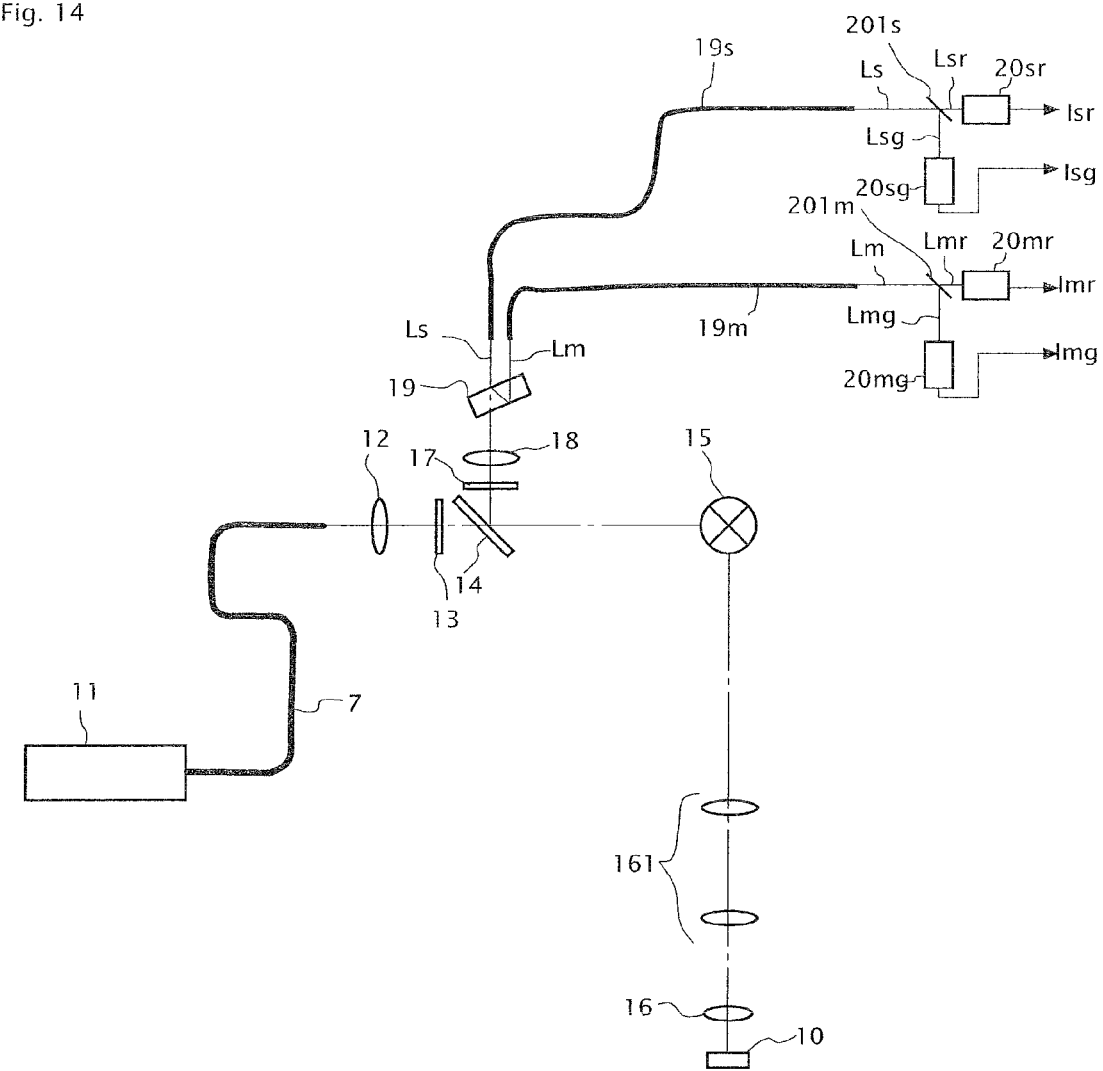
FIG. 14 is a structural view of optical systems of a confocal microscope apparatus of a third embodiment.

FIG. 14 is a structural view of optical systems of the confocal microscope apparatus of the present embodiment. A sample 10 disposed in the optical systems is previously dyed by two types of fluorescent materials having different excitation wavelengths (a first fluorescent material and a second fluorescent material), and the laser unit 11 irradiates laser light whose wavelength is the same as an excitation wavelength of the first fluorescent material and laser light whose wavelength is the same as an excitation wavelength of the second fluorescent material.

Therefore, both the first fluorescent material and the second fluorescent material are excited in the sample 10, so that the fluorescence emitted from the sample 10 includes two wavelength components having different wavelengths. Hereinafter, it is supposed that one of these two wavelength components is an R-color component corresponding to a red color, and the other one is a G-color component corresponding to a green color. In this case, the one fluorescence Ls emitted from the light separating member 19 includes the R-color component and the G-color component, and the other fluorescence Lm emitted from the light separating member 19 also includes the R-color component and the G-color component.

In this confocal microscope apparatus, the fluorescence Ls emitted from the optical fiber 19s is incident on a dichroic mirror 201s, and is separated into an R-color component Lsr and a G-color component Lsg. Between the above, the R-color component Lsr is incident on a light detector 20sr, and is converted into a fluorescence signal Isr. Further, the G-color component Lsg is incident on a light detector 20sg, and is converted into a fluorescence signal Isg.

Further, the fluorescence Lm emitted from the optical fiber 19m is incident on a dichroic mirror 201m, and is separated into an R-color component Lmr and a G-color component Lmg. Between the above, the R-color component Lmr is incident on a light detector 20mr, and is converted into a fluorescence signal Imr. Further, the G-color component Lmg is incident on a light detector 20mg, and is converted into a fluorescence signal Img.

The above-described four types of fluorescence signals Isr, Isg, Imr, and Img are accumulated in four frame memories in a parallel manner via separate routes, in a similar manner as the two types of fluorescence signals Is and Im are accumulated in the two frame memories in a parallel manner via separate routes in the first embodiment.

Figure 15:
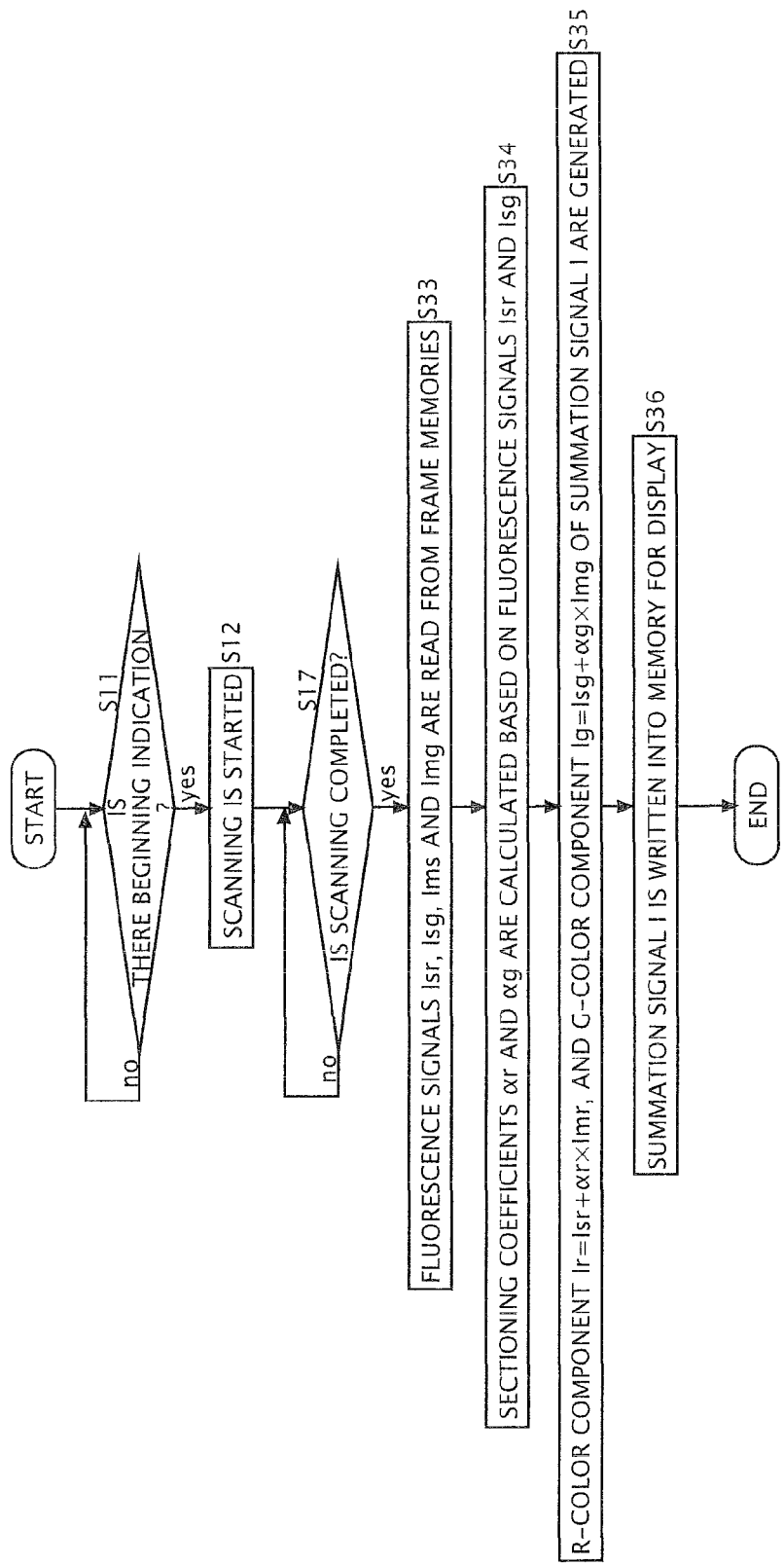
FIG. 15 is an operational flow chart of a CPU 221 of the third embodiment.

FIG. 15 is an operational flow chart of the CPU 221 of the present embodiment.

Step S11: The CPU 221 determines whether or not an observation beginning indication is input from a user. When the indication is input, the process proceeds to step S12.

Step S12: The CPU 221 gives a scanning indication to the controlling circuit 210. Accordingly, scanning is started, and the fluorescence signals Is and Im are started to be accumulated in the frame memories 220s and 220m, respectively.

Step S17: The CPU 221 determines whether or not the scanning is completed, based on the presence/absence of an end signal from the controlling circuit 210. When the scanning is not completed, the CPU 221 stands by, and when the scanning is completed, the process proceeds to step S33.

Step S33: The CPU 221 reads the fluorescence signal Isr for one frame, the fluorescence signal Isg for one frame, the fluorescence signal Imr for one frame, and the fluorescence signal Img for one frame accumulated in the four frame memories through the scanning.

Step S34: The CPU 221 calculates, based on the read fluorescence signals Isr and Isg, a sectioning coefficient $\alpha r$ of the R-color component and a sectioning coefficient $\alpha g$ of the G-color component. The sectioning coefficient $\alpha r$ of the R-color component is calculated based on a mean value of the fluorescence signal Isr in the frame, and the sectioning coefficient $\alpha g$ of the G-color component is calculated based on a mean value of the fluorescence signal Isg in the frame.

A relationship between the mean values and the sectioning coefficients is the same as the relationship between the fluorescence signal Is and the sectioning coefficient $\alpha$ in the first embodiment (refer to FIG. 8). Accordingly, the present step also uses a look-up table having the same input-output characteristic as that used in the first embodiment.

Step S35: The CPU 221 generates a summation signal Ir=Isr+$\alpha r \cdot$Imr of the R-color component, based on the calculated sectioning coefficient $\alpha r$ of the R-color component, the read fluorescence signal Isr, and the read fluorescence signal Imr. Further, the CPU 221 generates a summation signal Ig=Isg+$\alpha g \cdot$Img of the G-color component, based on the calculated sectioning coefficient $\alpha g$ of the G-color component, the read fluorescence signal Isg, and the read fluorescence signal Img. Further, the CPU 221 generates a summation signal I based on the generated two types of summation signals Ir and Ig. The summation signal I is a two-colored color signal formed only of the R-color component and the G-color component. To the R-color component of the summation signal I, a value of the summation signal Ir is given, and to the G-color component of the summation signal I, a value of the summation signal Ig is given.

Step S36: The CPU 221 writes the generated summation signal I into a predetermined area of the memory for display 224, and terminates the flow.

Thorough the above-described operation of the CPU 221, an image represented by the summation signal I is displayed on the monitor 23 as shown in FIG. 16D, for instance. Note that in FIGS. 16A, 16B, 16C, and 16D, the R-color component and the G-color component are drawn in an overlapped manner (a near side one is the R-color component) in order to indicate that each image has two color components.

The sectioning coefficient $\alpha$ of the image differs for each color component, and further, the sectioning coefficients $\alpha r$ and $\alpha g$ of the respective color components take values suitable for the brightness of objects corresponding to the color components. Hereinafter, the image is called "appropriate image", and an explanation thereof will be given in detail.

FIGS. 16A, 16B, and 16C show three types of images to be comparison objects of the appropriate image (FIG. 16D). These three types of images are different from the appropriate image in that the sectioning coefficient $\alpha$ in each image is common to the G-color component and the R-color component. Both the sectioning coefficients $\alpha r$ and $\alpha g$ of the image shown in FIG. 16A are −0.5, both the sectioning coefficients $\alpha r$ and $\alpha g$ of the image shown in FIG. 16B are ±0, and both the sectioning coefficients $\alpha r$ and $\alpha g$ of the image shown in FIG. 16C are +1.

Here, it is supposed that on the image of FIG. 16B, the R-color component has an appropriate brightness, and the G-color component is black-saturated. In this case, if both the sectioning coefficients $\alpha r$ and $\alpha g$ are changed from ±0 to 1, the appropriately bright R-color component becomes a hazy R-color component, and the black-saturated G-color component obtains an appropriate brightness, as shown in FIG. 16C, for instance. On the contrary, if both the sectioning coefficients $\alpha r$ and $\alpha g$ are changed from ±0 to −0.5, the appropriately bright R-color component becomes a black-saturated R-color component as shown in FIG. 16A, for instance.

What the CPU 221 of the present embodiment performed in step S34 was processing for calculating, based on the brightness of each of the color components on the image shown in FIG. 16B, the sectioning coefficient $\alpha r$ and $\alpha g$ suitable for each of the color components. For instance, the CPU 221 calculates the value of the sectioning coefficient $\alpha r$ of the appropriately bright R-color component on the image shown in FIG. 16B as ±0, and calculates the value of the sectioning coefficient $\alpha g$ of the black-saturated G-color component on the image shown in FIG. 16B as +1.

Accordingly, the appropriate image (FIG. 16D) generated in this case is a resultant of mutual overlap of the appropriately bright color component (R-color component) on the image shown in FIG. 16B, and the appropriately bright color component (G-color component) on the image shown in FIG. 16C. Therefore, in the appropriate image (FIG. 16D), each of the R-color component and the G-color component in the viewing field is represented by an appropriate brightness.

Note that although the CPU 221 of the present embodiment calculates the sectioning coefficient $\alpha$ using the look-up table, it may perform the calculation through an equation.

Further, the CPU 221 of the present embodiment sets the sectioning coefficient $\alpha$ for each of the color components on the image, but, it may set the sectioning coefficient $\alpha$ for each of the color components and for each of areas on the image. Specifically, it is possible to combine the first embodiment with the present embodiment. In such a case, it is possible to perform the generation and display of the appropriate image in real time during an obtaining period of the fluorescence signals.

Further, the CPU 221 of the present embodiment refers to an average brightness of the image whose sectioning coefficient $\alpha r$ is 0 (namely, the image represented by the fluorescence signal Isr) for determining the sectioning coefficient or of the R-color component on the image, but, it may refer to an average brightness of the image whose sectioning coefficient $\alpha r$ is other than 0 (the image represented by the summation signal (Isr+Imr), for instance).

Further, the CPU 221 of the present embodiment refers to an average brightness of the image whose sectioning coefficient $\alpha g$ is 0 (namely, the image represented by the fluorescence signal Isg) for determining the sectioning coefficient $\alpha g$ of the G-color component on the image, but, it may refer to an average brightness of the image whose sectioning coefficient $\alpha g$ is other than 0 (the image represented by the summation signal (Isg+Img), for instance).

Further, the CPU 221 of the present embodiment may store, in accordance with a storage indication or the like from a user, the generated appropriate image (or the values of the calculated sectioning coefficients $\alpha r$ and $\alpha g$) in the hard disk drive 223. At this time, it is preferable that the appropriate image (or the values of the calculated sectioning coefficients $\alpha r$ and $\alpha g$) is (are) corresponded to the image represented by the fluorescence signal Isr, the image represented by the fluorescence signal Isg, the image represented by the fluorescence signal Imr, and the image represented by the fluorescence signal Img obtained through the same scanning.

Further, the CPU 221 of the present embodiment automatically determines the sectioning coefficients $\alpha r$ and $\alpha g$ of the respective color components, but, it may allow the user to designate the sectioning coefficient of at least one color component. Specifically, the aforementioned second embodiment is a modified example of the first embodiment, and the present embodiment can also be modified in the same manner.

Further, although the number of channels of the microscope apparatus of the present embodiment is 2, it may be increased to 3 or more. In such a case, since the number of color components on the image is increased, the number of sectioning coefficients to be set individually is also increased according thereto.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A confocal microscope apparatus, comprising:
   a light source;
   an illuminating optical system collecting light from the light source onto a sample;
   a collecting optical system collecting light from the sample;
   a detecting unit being disposed on a collecting location at a single depth direction of the collecting optical system, separating incident light into at least a light from a vicinity of a collecting point on the sample and a light from a peripheral of the vicinity of the collecting point, and detecting each of the lights; and
   an image generating unit generating an image of the sample by performing calculation processing on a signal of the light from the vicinity of the collecting point and a signal of the light from the peripheral of the vicinity of the collecting point output from the detecting unit, and setting a ratio of the signal of the light from the vicinity of the collecting point to the signal of the light from the peripheral of the vicinity of the collecting point for each of areas on the image, wherein
   the image generating unit displays the image in accordance with the ratio set for each of the areas on the image, and
   the ratios for each of the areas can change independently and continuously to non-incrementally adjust a sectioning resolution.

2. The confocal microscope apparatus according to claim 1, wherein the image generating unit performs one of a calculation of summation and a calculation of difference between the signal of the light from the vicinity of the collecting point and the signal of the light from the peripheral of the vicinity of the collecting point in accordance with the ratio being set.

3. The confocal microscope apparatus according to claim 1, wherein the image generating unit sets the ratio based on the signal of the light from the vicinity of the collecting point.

4. The confocal microscope apparatus according to claim 1, wherein the image generating unit sequentially generates the image while setting the ratio for each of the areas.

5. The confocal microscope apparatus according to claim 1, wherein the image generating unit has a storage unit storing each of the signal of the light from the vicinity of the collecting point and the signal of the light from the peripheral of the vicinity of the collecting point, and sets the ratio for each of the areas in the storage unit.

6. The confocal microscope apparatus according to claim 5, wherein the image generating unit sets the ratio for each of the areas in accordance with an instruction from a user.

7. A confocal microscope apparatus, comprising:
   a light source;
   an illuminating optical system collecting light from the light source onto a sample;
   a collecting optical system collecting light from the sample;
   a detecting unit being disposed on a collecting location at a single depth direction of the collecting optical system, separating incident light into at least a light from a vicinity of a collecting point on the sample and a light from a peripheral of the vicinity of the collecting point, separating each of the lights into wavelength components, and detecting each of the lights for each of the wavelength components; and
   an image generating unit generating an image of the sample for each of the wavelength components by performing calculation processing on a signal of the light from the vicinity of the collecting point for each of the wavelength components and a signal of the light from the peripheral of the vicinity of the collecting point for each of the wavelength components output from the detecting unit, and setting a ratio of the signal of the light from the vicinity of the collecting point to the signal of the light from the peripheral of the vicinity of the collecting point for each of areas on the image for each of the wavelength components, wherein
   the image generating unit displays the image in accordance with the ratio set for each of the areas on the image, and
   the ratios for each of the areas can change independently and continuously to non-incrementally adjust a sectioning resolution.

8. The confocal microscope apparatus according to claim 7, wherein the image generating unit performs one of a calculation of summation and a calculation of difference between the signal of the light from the vicinity of the collecting point and the signal of the light from the peripheral of the vicinity of the collecting point in accordance with the ratio being set.

9. The confocal microscope apparatus according to claim 7, wherein the image generating unit sets the ratio based on the signal of the light from the vicinity of the collecting point.

10. The confocal microscope apparatus according to claim 7, wherein the image generating unit sequentially generates the image while setting the ratio for each of the areas.

11. The confocal microscope apparatus according to claim 7, wherein the image generating unit has a storage unit storing each of the signal of the light from the vicinity of the collecting point and the signal of the light from the peripheral of the vicinity of the collecting point, and sets the ratio for each of the areas in the storage unit.

12. The confocal microscope apparatus according to claim 11, wherein the image generating unit sets the ratio for each of the areas in accordance with an instruction from a user.

* * * * *